United States Patent
Maeda (10) Patent No.: US 9,956,482 B2
(45) Date of Patent: *May 1, 2018

(54) SERVER, COMMUNICATION SYSTEM, METHOD FOR CONTROLLING COMMUNICATION SYSTEM, AND PROGRAM

(71) Applicant: GREE, INC., Tokyo (JP)

(72) Inventor: Masahito Maeda, Tokyo (JP)

(73) Assignee: GREE, INC., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/649,823

(22) Filed: Jul. 14, 2017

(65) Prior Publication Data

US 2017/0312625 A1    Nov. 2, 2017

Related U.S. Application Data

(63) Continuation of application No. 15/146,212, filed on May 4, 2016, now Pat. No. 9,737,805, which is a continuation of application No. 14/229,511, filed on Mar. 28, 2014, now Pat. No. 9,361,761.

(30) Foreign Application Priority Data

Mar. 29, 2013 (JP) ................................. 2013-072333

(51) Int. Cl.
*A63F 13/35* (2014.01)
*A63F 13/55* (2014.01)
*G07F 17/32* (2006.01)

(52) U.S. Cl.
CPC .............. *A63F 13/35* (2014.09); *A63F 13/55* (2014.09); *G07F 17/326* (2013.01); *G07F 17/329* (2013.01); *G07F 17/3244* (2013.01)

(58) Field of Classification Search
USPC .......................................................... 463/17
See application file for complete search history.

(56) References Cited

U.S. PATENT DOCUMENTS

| | | | |
|---|---|---|---|
| 8,429,001 B2 | 4/2013 | Dance et al. | |
| 2011/0302041 A1 | 12/2011 | Dance et al. | |
| 2014/0087865 A1* | 3/2014 | Carrico | G07F 17/3211 463/29 |

(Continued)

FOREIGN PATENT DOCUMENTS

| | | |
|---|---|---|
| JP | 2008-220984 A | 9/2008 |
| JP | 2008-253521 A | 10/2008 |

(Continued)

OTHER PUBLICATIONS

Feb. 24, 2015 Office Action issued in Japanese Patent Application No. 2014-240454.

(Continued)

*Primary Examiner* — Pierre E Elisca
(74) *Attorney, Agent, or Firm* — Oliff PLC (57) ABSTRACT

A server includes drawing means for drawing an item by lottery from among an item group including a plurality of types of items with different scarcity values and providing the item to a user, and additional item providing means for providing an additional item to the user in accordance with a provision count of the number of times an item is provided by the drawing means.

20 Claims, 11 Drawing Sheets

(56) References Cited

U.S. PATENT DOCUMENTS

2014/0295933 A1* 10/2014 Sano .................... G07F 17/329
                                                              463/17
2014/0309009 A1* 10/2014 Kim ...................... G06Q 50/34
                                                              463/18

FOREIGN PATENT DOCUMENTS

| JP | 2010-004944 A | 1/2010 |
| JP | 2012-038150 A | 2/2012 |
| JP | 2012-196424 A | 10/2012 |
| JP | 2012-244761 A | 12/2012 |
| JP | 5111651 B1 | 1/2013 |
| JP | 5280579 B1 | 9/2013 |

OTHER PUBLICATIONS

"Online RPG Celes Arca," MacPeople, Mar. 2013, p. 155, vol. 8.

"Monthly 'Mobile mail order' Mobile SNS wavering with 'complete gacha': any impact on the ability to attract austomers?," Monthly Net Mail Order, Jun. 2012, p. 47, vol. 13, No. 6.

Jun. 17, 2014 Japanese Office Action issued in Japanese Patent Application No. 2014-71900.

May 31, 2016 Office Action issued in Japanese Patent Application No. 2015-131983.

Jun. 25, 2013 Office Action issued in Japanese Application No. JP 2013-072333.

Nov. 19, 2013 Office Action issued in Japanese Application No. 2013-072333.

Feb. 4, 2014 Office Action issued in Japanese Application No. 2013-072333.

* cited by examiner

| Item identification information | Item name | Item image | Attack strength | Defense strength | Item type |
|---|---|---|---|---|---|
| ITM001 | ItemA | ItemA image | 1000 | 500 | 3 |
| ITM002 | ItemB | ItemB image | 500 | 300 | 1 |
| ITM003 | ItemC | ItemC image | 800 | 400 | 2 |
| ITM004 | ItemD | ItemD image | 400 | 400 | 1 |
| ITM005 | ItemE | ItemE image | 2000 | 1000 | 4 |
| ITM006 | ItemF | ItemF image | 500 | 500 | 2 |
| ITM007 | ItemG | ItemG image | 400 | 800 | 2 |
| ITM008 | ItemH | ItemH image | 500 | 1000 | 3 |
| ITM009 | ItemI | ItemI image | 600 | 600 | 2 |
| ITM010 | ItemJ | ItemJ image | 2500 | 2500 | 6 |
| ITM011 | ItemK | ItemK image | 3000 | 2500 | 7 |
| ITM012 | ItemL | ItemL image | 3000 | 3800 | 8 |
| ... | ... | ... | ... | ... | ... |

| User identification information | Item provision count | Information on fever state | Start time of fever state | Identification information on a provided item | Identification information on a provided item | ... |
|---|---|---|---|---|---|---|
| UID001 | 4 | ON | 2013/2/15 13:24 | ITM002 | ITM004 | ... |
| UID002 | 2 | OFF | — | ITM001 | ITM010 | ... |
| UID003 | 5 | ON | 2013/2/17 14:01 | ITM007 | ITM009 | ... |
| ... | ... | ... | ... | ... | ... | ... |

| Item provision count | Item identification information |
|---|---|
| 1 | ITM00 |
| 2 | ITM01 |
| 3 | ITM02 |
| ... | ... |

| User identification information | Item provision count | Level | Identification information on a provided item | Identification information on a provided item | ... |
|---|---|---|---|---|---|
| UID001 | 4 | 2 | ITM002 | ITM004 | ... |
| UID002 | 2 | 1 | ITM001 | ITM010 | ... |
| UID003 | 5 | 2 | ITM007 | ITM009 | ... |
| ... | ... | ... | ... | ... | ... |

| Level | Identification information on an additional item |
|---|---|
| 1 | - |
| 2 | ITM201 |
| 3 | ITM202 |
| ... | ... |

SERVER, COMMUNICATION SYSTEM, METHOD FOR CONTROLLING COMMUNICATION SYSTEM, AND PROGRAM

CROSS-REFERENCE TO RELATED APPLICATION

This application is a Continuation of U.S. patent application Ser. No. 15/146,212, filed May 4, 2016, which in turn is a Continuation of U.S. patent application Ser. No. 14/229,511, filed Mar. 28, 2014 and issued as U.S. Pat. No. 9,361,761 on Jun. 7, 2016, which in turn claims priority to and the benefit of Japanese Patent Application No. 2013-072333 filed Mar. 29, 2013, the entire contents of which are incorporated herein by reference.

TECHNICAL FIELD

The present invention relates to a server that provides a game, to a communication system, to a method for controlling a communication system, and to a program.

BACKGROUND ART

A competitive game server has been proposed to form a player's deck from game cards or the like stored for each user in the competitive game server and to allow multiple players to compete based on the attack strength and defense strength of the deck (for example, see Patent Literature 1). In such a competitive game server, a user acquires a game card by methods such as purchasing the game card or obtaining the game card by winning a match against a competitor.

CITATION LIST

Patent Literature

Patent Literature 1: JP2008-220984A

SUMMARY OF INVENTION

Technical Problem

In a conventional competitive game server, however, the methods for acquiring game cards and the like are limited, causing the user to lose interest in the game.

The present invention has been conceived in light of the above circumstances and therefore provides a server, a communication system, and a method for controlling a communication system that can increase the variations on methods for acquiring game cards and the like.

Solution to Problem

In order to resolve the above problem, a server according to the present invention includes drawing means for drawing an item by lottery from among an item group including a plurality of types of items with different scarcity values and providing the item to a user; and additional item providing means for providing an additional item to the user in accordance with a provision count of a number of times an item is provided by the drawing means.

In the server according to the present invention, the additional item providing means may provide the additional item to the user by including at least one additional item in the item group when the provision count is at least a predetermined count.

In the server according to the present invention, the additional item providing means may provide the additional item to the user by including at least one additional item in the item group for a predetermined time starting when the provision count reaches at least a predetermined count.

In the server according to the present invention, the additional item providing means may provide the additional item to the user by including at least one additional item in the item group in accordance with the provision count.

In the server according to the present invention, the additional item providing means may also provide an additional item to the user in accordance with the item drawn by lottery by the drawing means.

In the server according to the present invention, the server may also transmit information on the reception count to the user.

A communication system according to the present invention includes a server and a communication terminal, the server providing an item to the communication terminal in response to a request from the communication terminal, such that the communication terminal transmits an item acquisition request to the server, and the server provides an item to the communication terminal with drawing means for drawing the item by lottery from among an item group including a plurality of types of items with different scarcity values, and provides an additional item to the communication terminal with additional item providing means in accordance with a provision count of a number of times an item is provided by the drawing means.

In the communication system according to the present invention, the additional item providing means may provide the additional item to the communication terminal by including at least one additional item in the item group when the provision count is at least a predetermined count.

In the communication system according to the present invention, the additional item providing means may provide the additional item to the communication terminal by including at least one additional item in the item group for a predetermined time starting when the provision count reaches at least a predetermined count.

In the communication system according to the present invention, the additional item providing means may provide the additional item to the communication terminal by including at least one additional item in the item group in accordance with the provision count.

In the communication system according to the present invention, the additional item providing means may also provide an additional item to the communication terminal in accordance with the item drawn by lottery by the drawing means.

In the communication system according to the present invention, the server may also transmit information on the reception count to the communication terminal.

A method according to the present invention for controlling a communication system including a server and a communication terminal, the server providing an item to the communication terminal in response to a request from the communication terminal includes the steps of (a) transmitting, by the communication terminal, an item acquisition request to the server; (b) providing, by the server, an item to the communication terminal with drawing means for drawing the item by lottery from among an item group including a plurality of types of items with different scarcity values; and (c) providing, by the server, an additional item to the communication terminal with additional item providing means in accordance with a provision count of a number of times an item is provided by the drawing means.

In the method according to the present invention for controlling a communication system, in step (c), the additional item may be provided to the communication terminal by including at least one additional item in the item group when the provision count is at least a predetermined count.

In the method according to the present invention for controlling a communication system, in step (c), the additional item may be provided to the communication terminal by including at least one additional item in the item group for a predetermined time starting when the provision count reaches at least a predetermined count.

In the method according to the present invention for controlling a communication system, in step (c), the additional item may be provided to the communication terminal by including at least one additional item in the item group in accordance with the provision count.

In the method according to the present invention for controlling a communication system, in step (c), an additional item may also be provided to the communication terminal in accordance with the item drawn by lottery by the drawing means.

The method according to the present invention for controlling a communication system may further include the step of (d) transmitting, by the server, information on the reception count to the communication terminal.

A non-transitory computer readable recording medium according to the present invention stores instructions for a computer functioning as a communication terminal in a communication system including a server and the communication terminal, the server providing an item to the communication terminal in response to a request from the communication terminal, the instructions causing the computer to perform the steps of: (a) transmitting an item acquisition request to the server; (b) receiving provision, from drawing means in the server, of an item drawn by lottery from among an item group including a plurality of types of items with different scarcity values; and (c) receiving provision, from additional item providing means in the server, of an additional item provided in accordance with a provision count of a number of times an item is provided by the drawing means.

A communication terminal according to the present invention is in a communication system including a server and the communication terminal, the server providing an item to the communication terminal in response to a request from the communication terminal, the communication terminal including: communication means for transmitting an item acquisition request to the server, receiving provision, from drawing means in the server, of an item drawn by lottery from among an item group including a plurality of types of items with different scarcity values, and receiving provision, from additional item providing means in the server, of an additional item provided in accordance with a provision count of a number of times an item is provided by the drawing means.

Advantageous Effect of Invention

The server, communication system, method for controlling a communication system, and program according to the present invention increase the variations on methods for acquiring a game card or the like.

BRIEF DESCRIPTION OF DRAWINGS

The present invention will be further described below with reference to the accompanying drawings, wherein.

DESCRIPTION OF EMBODIMENTS

The following describes embodiments of the present invention.

Embodiment 1

Figure 1:
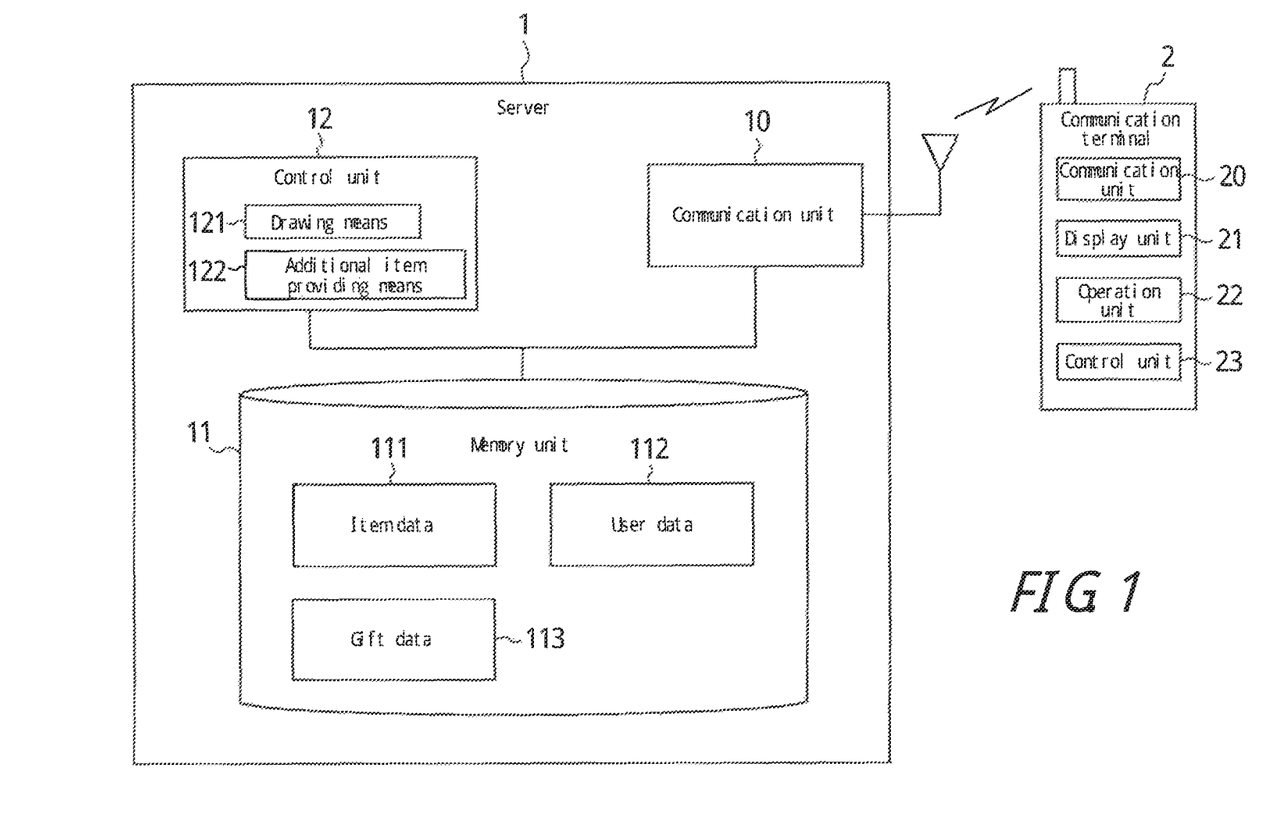
FIG. 1 is a block diagram of a communication system according to Embodiment 1.

FIG. 1 is a block diagram of a communication system according to Embodiment 1 of the present invention. The communication system according to Embodiment 1 of the present invention includes a server 1 (game server 1) and a communication terminal 2.

The server 1 includes a communication unit 10, a memory unit 11, and a control unit 12.

The communication unit 10 communicates with the communication terminal 2 over either or both of a wireless and wired connection.

The memory unit 11 stores information on items provided to the communication terminal 2 and on the item type. An "item" refers to any of a variety of objects used within a game, such as a game card constituting a user's deck, a character, a weapon, armor, an ornament, a plant, food, and the like. The item type is a numerical value representing the scarcity value of the item, a numerical value representing the category of the item, or the like. Below, the item type is described as being a numerical value representing the scarcity value of the item, yet the item type is not limited in this way.

Specifically, the memory unit 11 stores item data 111, user data 112, and gift data 113.

Figure 2:
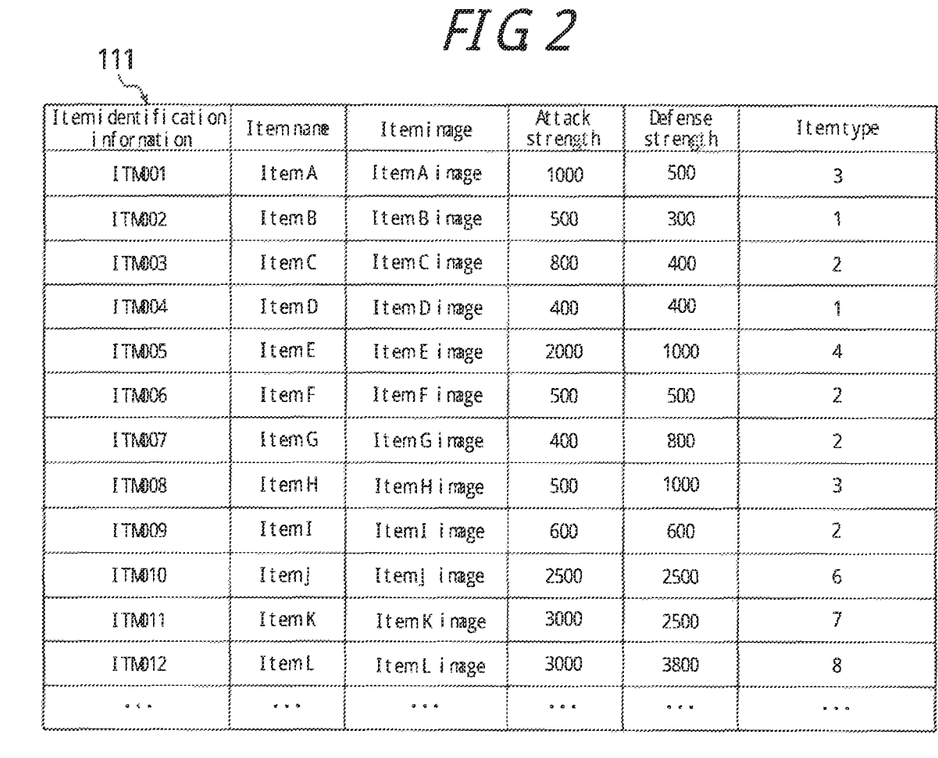
FIG. 2 is an example of item data according to Embodiment 1.

The item data 111 stores data on an image or the like for an item provided to the user in association with item identification information. The item identification information is an identifier for uniquely identifying an item in the present system. FIG. 2 illustrates an example of the item data 111. As illustrated in FIG. 2, the item data for example includes item identification information "ITM001", an item name "item A", an item image "item A image", an attack strength "1000", a defense strength "500", and an item type "3". The attack strength and defense strength are parameters related to the strength of the item. The image data may be in any image format, such as JPEG, GIF, PNG, or the like.

Figure 3:
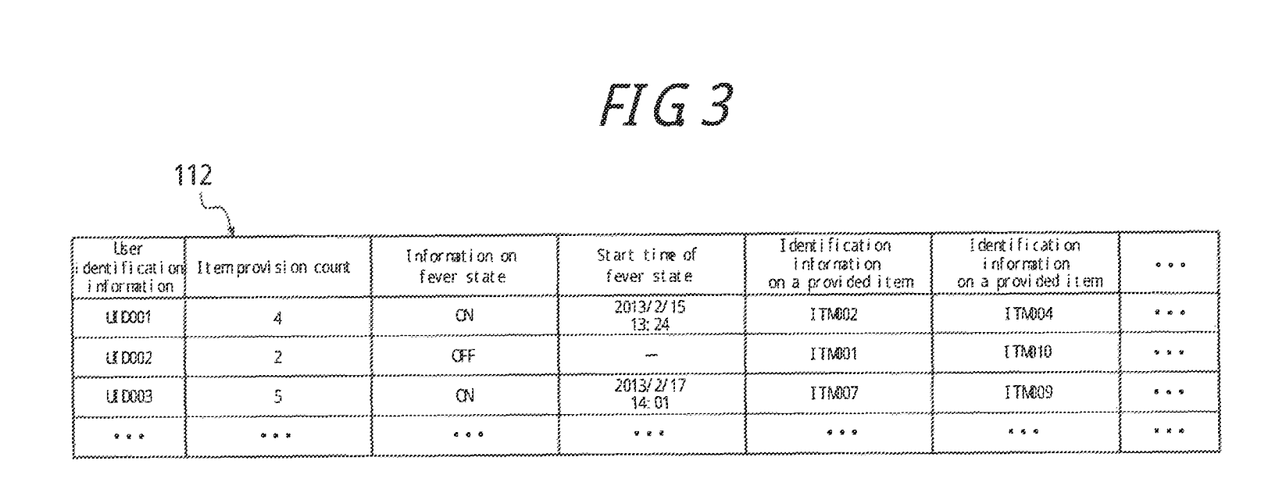
FIG. 3 is an example of user data according to Embodiment 1.

In general terms, the user data 112 stores, for each piece of user identification information, a count of the number of times the server 1 has provided an item to the communication terminal 2 and information on the provided items. Specifically, the user data 112 stores, in association, the user identification information, item provision count, and identification information on a provided item. The user identification information is an identifier for uniquely identifying a user in the present system. The item provision count is a count of the number of times the server 1 has provided an item to the communication terminal 2 pertaining to each piece of user identification information. The identification information on a provided item is item identification information for each item the server 1 has provided to the communication terminal 2 pertaining to each piece of user identification information.

The user data 112 more preferably includes information on a fever state. The fever state indicates a state in which the item provision count is at least a predetermined count (for example, four times or more). In general terms, in the present embodiment, an incentive is provided during the fever state, such as additionally providing the user with an item (referred to below as an additional item). Preferably, the fever state is maintained for a predetermined time, and in this case, the user data 112 stores the start time of the fever state.

FIG. 3 illustrates an example of the user data 112. As illustrated in FIG. 3, the user data 112 for example includes "UID001" as the user identification information, "4" as the item provision count, "ON" as the information on the fever state, "2013/2/15 13:24" as the start time of the fever state, and "ITM002" and "ITM004" as the identification information on a provided item. Note that the information on the fever state is one of two values, either "ON" or "OFF". "ON" indicates that the user is in the fever state, and "OFF" indicates that the user is not in the fever state.

Figure 4:
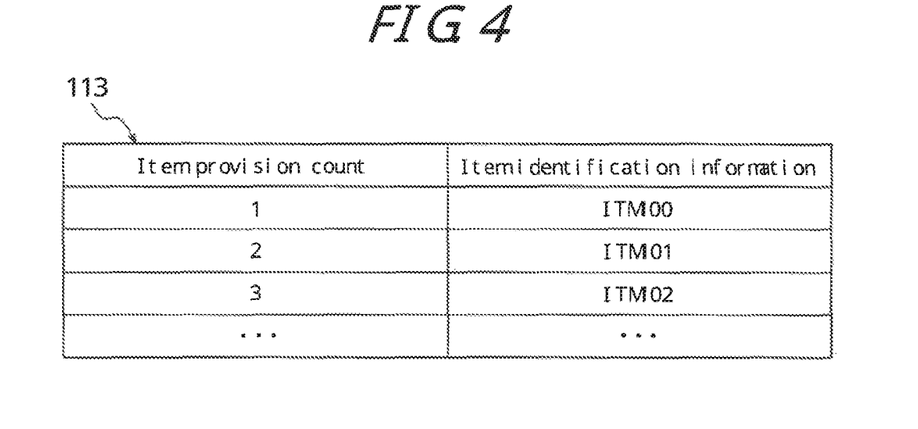
FIG. 4 is an example of additional item data according to Embodiment 1.

The gift data 113 stores information on gifts provided to the user. A gift is an additional item that the server 1 provides to the user in accordance with the item provision count. FIG. 4 illustrates an example of the gift data 113. As illustrated in FIG. 4, the gift data 113 for example includes "1" as the item provision count, "ITM100" as the item identification information, and the like. Preferably, as the item provision count is higher, the server 1 provides the user with an item having a higher item type as a gift.

The control unit 12 includes drawing means 121 and additional item providing means 122 and performs a variety of control pertaining to the server 1. Upon receiving an item acquisition request from the communication terminal 2, the control unit 12 uses the drawing means 121 to draw, by lottery, an item for provision and to provide the drawn item. The item acquisition request includes the user identification information, so that the control unit 12 can determine the user from which the item acquisition request was received. When the control unit 12 receives an item acquisition request from the communication terminal 2, the drawing means 121 draws an item, by lottery, from among an item group including a plurality of types of items with different scarcity values. The item group is, for example, composed of items of item type three or less. The item group may include a plurality of the same item. The drawing means 121 refers to the user data 112 to draw an item, by lottery, from among items in the item group that have not yet been provided to the user.

The control unit 12 provides the item drawn by the drawing means 121 to the user, i.e. to the communication terminal 2. Specifically, based on the item data 111, the control unit 12 transmits the item image corresponding to the item identification information for the provided item to the communication terminal 2 via the communication unit 10. Each time an item is provided to the communication terminal 2, the control unit 12 increments the item provision count in the user data 112 by one. When providing an item to the communication terminal 2, the control unit 12 also stores the item identification information for the item in the user data 112 as identification information on a provided item. Furthermore, when the item provision count in the user data 112 is at least a predetermined count, the control unit 12 stores a value of "ON" for the information on the fever state.

Upon receiving an item acquisition request from the communication terminal 2, the control unit 12 also uses the additional item providing means 122 to select an additional item (gift) corresponding to the item provision count and to provide the additional item to the user.

Specifically, the additional item providing means 122 refers to the gift data 113 and selects an additional item to provide to the user in accordance with the item provision count. The control unit 12 then provides the additional item to the user. Based on the item data 111, the control unit 12 transmits the item image corresponding to the identification information on an additional item to the communication terminal 2 via the communication unit 10.

Figure 5:
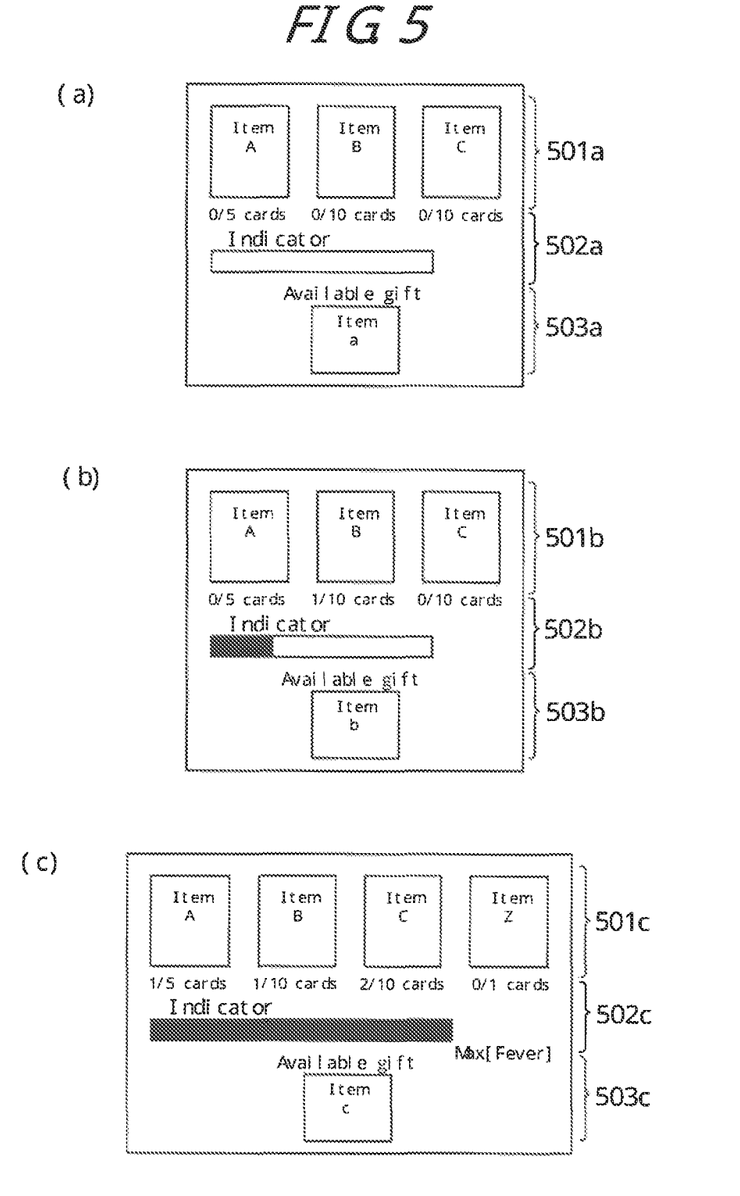
FIG. 5 is an image of provision of an additional item according to Embodiment 1.

FIG. 5 is an image of the above-described provision of an additional item. Preferably, this image is displayed on the communication terminal 2 as a screen for requesting item acquisition. The screen for requesting item acquisition is a user interface for transmitting an item acquisition request to the server 1. Note that when this image is displayed on the communication terminal 2 as a screen for requesting item acquisition, the screen is provided with a button for transmitting an item request (not illustrated). With this screen, the user can confirm which additional item can be acquired when requesting an additional item with the communication terminal 2.

FIG. 5(*a*) is an image including identification information on a provided item for a user with an item provision count of zero, information on the item provision count, and information on an additional item that will be provided. In area 501*a*, the number of provisions of each item in the item group is displayed. In FIG. 5(*a*), the number of provisions of item A, item B, and item C is 0/5 cards, 0/10 cards, and 0/10 cards respectively. The denominator is the total number of each item included in the item group, and the numerator is the number of items provided. In area 502*a*, information on the item provision count is displayed. In FIG. 5, this information is displayed as an indicator. The value of the indicator increases in proportion to the item provision count. Specifically, the value of the indicator increases by one notch each time the item provision count increases by one, and when the item provision count reaches a predetermined value (for example, four), the value of the indicator reaches its maximum value. In area 503*a*, information on the gift to be provided by the additional item providing means 122 for the current item provision count is displayed. In FIG. 5(*a*), provision of the gift "item a" is displayed.

By contrast, FIG. 5(*b*) is an image including identification information on a provided item for a user with an item provision count that is not zero, information on the item provision count, and information on an additional item that will be provided. As shown in area 501*b*, the number of provisions of item A, item B, and item C is 0/5 cards, 1/10 cards, and 0/10 cards respectively. The value of the indicator in area 502*b* is greater than the value shown in FIG. 5(*a*), since the item provision count is one. In area 503*b*, information on the additional item to be provided by the additional item providing means 122 for the current item provision count is displayed. In FIG. 5(*b*), provision of the gift "item b" is displayed.

Furthermore, when the item provision count is at least a predetermined count, the additional item providing means 122 provides the user with an additional item by including at least one additional item in the item group. Specifically, the control unit 12 refers to the user data 112, and when the user pertaining to the item acquisition request is in the fever state and is within a certain time from the start time of the fever state (for example, within one hour), the control unit 12 uses the additional item providing means 122 to include at least one additional item in the item group. The additional item that is added is preferably an item with an item type of 4 or greater. FIG. 5(*c*) is an image of provision of this additional item. As shown in area 501*c* of FIG. 5(*c*), the number of provisions of item A, item B, and item C is 1/5 cards, 1/10 cards, and 2/10 cards respectively. As also shown in area 502*c*, the value of the indicator is at the maximum value. This indicates that the item provision count is at least a predetermined value (four). In this case, the user is in the fever state, and "MAX (Fever)" is displayed near the indicator. At this time, as displayed in the area 501*c*, item Z has been added to the item group. When the user pertaining to the item acquisition request is in the fever state and a certain time has elapsed from the start time of the fever state, the control unit 12 rewrites the fever state in the user data 112 to be "OFF". The control unit 12 also sets the value of the indicator to zero.

The communication terminal 2 includes a communication unit 20, a display unit 21, an operation unit 22, and a control unit 23.

The communication unit 20 communicates with the server 1 over either or both of a wireless and wired connection. Specifically, based on user operation of the operation unit 22, the communication unit 20 transmits an item acquisition request to the server 1. The communication unit 20 also receives provision of an item corresponding to the item acquisition request from the server 1.

The display unit 21 is configured using a liquid crystal display, an organic EL display, or the like and outputs display pertaining to the game provided by the server 1. For example, the display unit 21 displays the item image pertaining to an item provided by the server 1.

The operation unit 22 is configured using buttons, a touch panel, or the like, and receives input signals from the user during the game. The operation unit 22 also transmits the input signals received from the user to the control unit 23.

The control unit 23 performs a variety of control pertaining to the communication terminal 2. For example, based on user operation of the operation unit 22, the control unit 23 transmits an item acquisition request to the server 1 via the communication unit 20.

Figure 6:
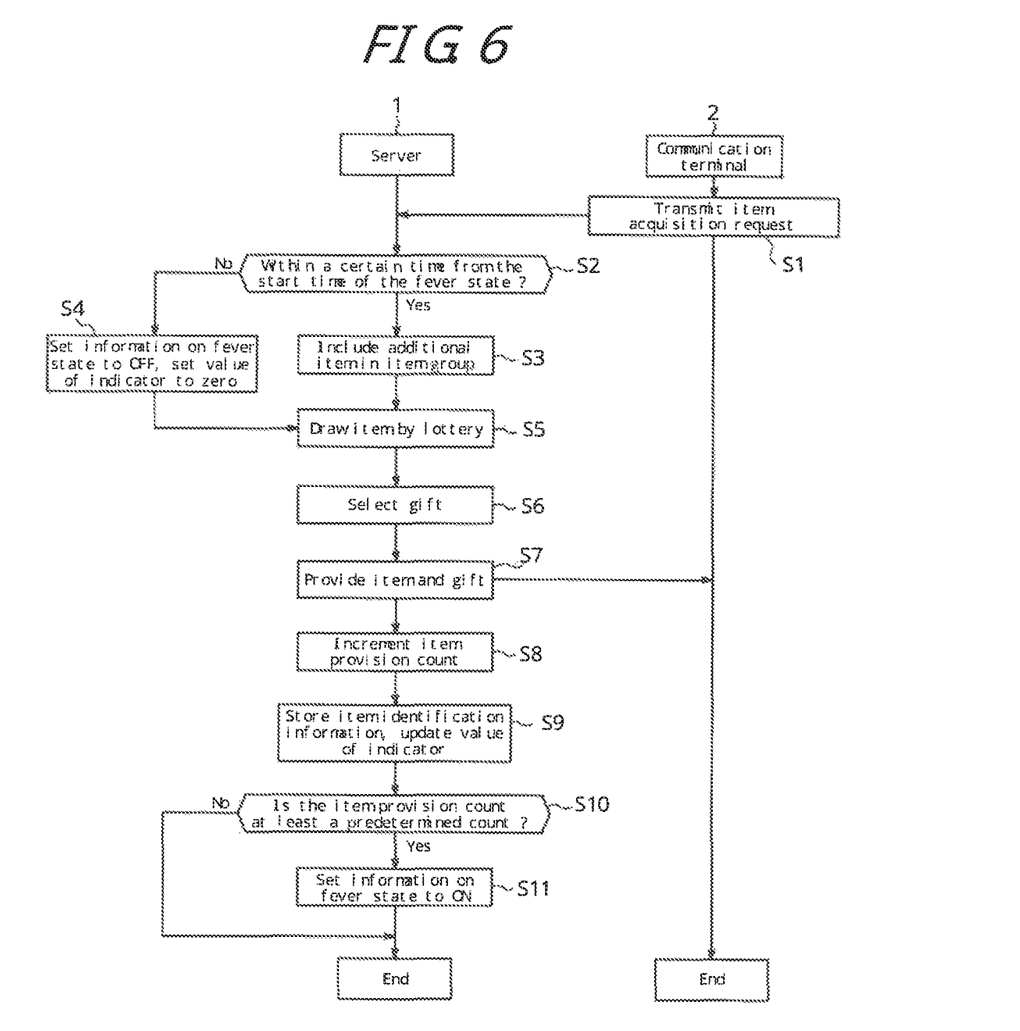
FIG. 6 is flowchart of operations by the communication system according to Embodiment 1 of the present invention.

Next, operations of the communication system according to Embodiment 1 are described using the flowchart in FIG. 6.

First, based on user operation of the operation unit 22, the control unit 23 in the communication terminal 2 transmits an item acquisition request to the server 1 via the communication unit 20 (step S1).

Next, when the server 1 receives the item acquisition request, the additional item providing means 122 of the control unit 12 refers to the user data 112 to determine whether the user pertaining to the item acquisition request is within a certain time (for example, within one hour) from the start time of the fever state (step S2). When the user is within a certain time from the start time of the fever state, the control unit 12 uses the additional item providing means 122 to include at least one additional item in the item group (step S3). Conversely, when the user is not within a certain time from the start time of the fever state, i.e. when a certain time has elapsed from the start time of the fever state, the control unit 12 rewrites the fever state in the user data 112 to be "OFF" and sets the value of the indicator to zero (step S4).

Next, the control unit 12 uses the drawing means 121 to draw an item, by lottery, from among the item group. The drawing means 121 refers to the user data 112 to draw an item, by lottery, from among items in the item group that have not yet been provided to the user (step S5).

Next, the additional item providing means 122 refers to the user data 112, and in accordance with the item provision count, selects a gift (additional item) to provide to the user based on the gift data 113 (step S6). The control unit 12 then provides the item drawn by the drawing means 121 and the gift selected by the additional item providing means 122 to the user. Specifically, based on the item data 111, the control unit 12 transmits the item images corresponding to the item identification information for the provided item and the gift to the communication terminal 2 via the communication unit 10 (step S7).

Next, the control unit 12 increments the item provision count in the user data 112 by one and updates the value of the indicator (step S8). Specifically, the control unit 12 increases the value of the indicator by one notch. The control unit 12 also stores the item identification information for the item in the user data 112 as identification information on a provided item (step S9).

Next, the control unit 12 determines whether the item provision count in the user data 112 is at least a predetermined count (step S10). When the item provision count is at least a predetermined count, the control unit 12 stores a value of "ON" for the information on the fever state and stores the start time of the fever state (step S11). Processing then ends.

According to Embodiment 1 of the present invention, the control unit 12 of the server 1 uses the additional item providing means 122 to provide an additional item in accordance with the item provision count. Therefore, the variations on methods for acquiring game cards and the like can be increased.

Note that the control unit 12 of the server 1 may further provide an additional item to the user in accordance with the item drawn by the drawing means 121. Specifically, for example when the item drawn by the drawing means 121 is less than a predetermined item type, the control unit 12 may provide a predetermined item (item request ticket or the like) to the user. The control unit 12 preferably provides the predetermined item to the user when the rank of the item drawn by the drawing means 121 is the lowest. The rank of the item is calculated by totaling a variety of parameters or the like of the item. Suppose, for example, that the item with the lowest rank is item B. When the item drawn by the drawing means 121 is item B, i.e. the item with the lowest rank, the control unit 12 provides the predetermined item to the user.

The server 1 may be configured to receive a reset request at any time from the communication terminal 2. In general terms, the reset request is a request for resetting the identification information on a provided item in the user data 112. Upon receiving a reset request from the communication terminal 2, the control unit 12 of the server 1 deletes the identification information on a provided item corresponding to the user identification information of the communication terminal 2. With this configuration, for example when an item within the item group is depleted, the information on provided items can be reset, so that the item can be acquired again. Upon a reset request, the item provision count is preferably left as is, without being returned to zero. In this way, even upon a reset, the possibility of acquiring an additional item can be maintained.

In the present embodiment, the server 1 provides an additional item (gift) to the user in accordance with the item provision count and includes the additional item in the item group, yet the additional item may be provided to the user in either of these ways. For example, it is possible only to provide an additional item (gift) in accordance with the item provision count. In this case, step S2 through step S4 in FIG. 6 are omitted. It is also possible, for example, only to include an additional item in the item group in accordance with the item provision count (when in the fever state). In this case, step S6 in FIG. 6 is omitted, and in step S7, the server 1 only provides the item to the communication terminal 2. Furthermore, in the present embodiment, the additional item is included in the item group, yet alternatively the additional item may be provided to the user from a new item group including a plurality of additional items. In other words, a new item group may be caused to appear only when in the fever state. Furthermore, when in the fever state, the user may be allowed to select whether an item is to be provided from the item group from which items were provided before the fever state or from the new item group.

In the present embodiment, the value of the indicator increases in proportion to the item provision count, yet the indicator is not limited in this way. For example, the value of the indicator may increase by one notch for an item provision count of one, three notches for an item provision count of two, and five notches for an item provision count of three. The value of the indicator may thus be caused to increase by a different amount depending on the item provision count.

As another example of the value of the indicator not increasing in proportion to the item provision count, the amount of increase in the indicator may be determined randomly at the time of item provision. When adopting this configuration, the control unit 12 of the server 1 determines that the user is in the fever state when the value of the indicator reaches the maximum value (for example, four notches).

Embodiment 2

Figure 7:
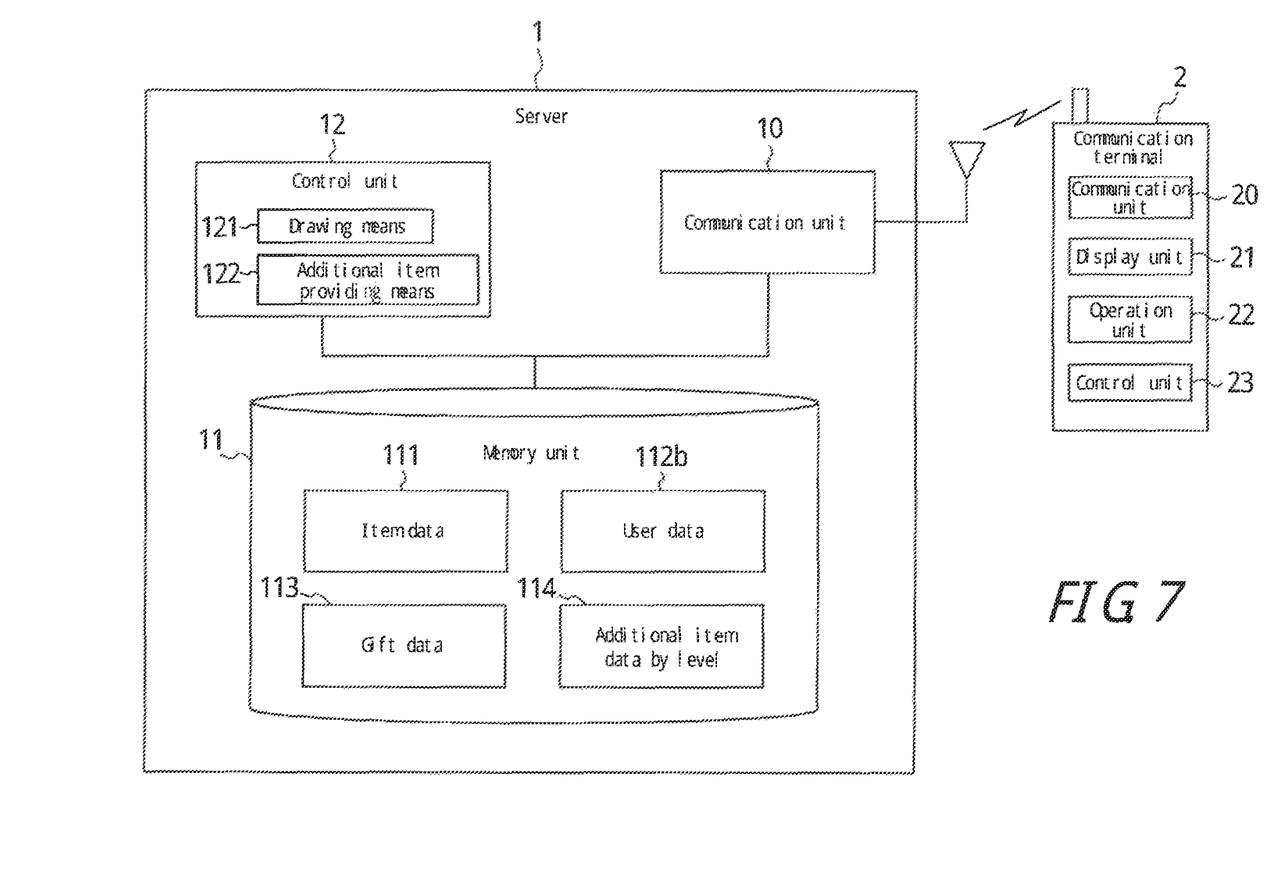
FIG. 7 is a block diagram of a communication system according to Embodiment 2.

The following describes Embodiment 2 of the present invention. FIG. 7 is a block diagram illustrating the structure of a communication system according to Embodiment 2 of the present invention. The same reference signs are provided for the same components as in Embodiment 1, and a description thereof is omitted. As compared to the structure of Embodiment 1, the communication system according to Embodiment 2 differs in that the memory unit 11 includes user data 112b and additional item data by level 114, and in that an additional item is provided in accordance with level. The level is a parameter that increases at each predetermined item provision count.

Figure 8:
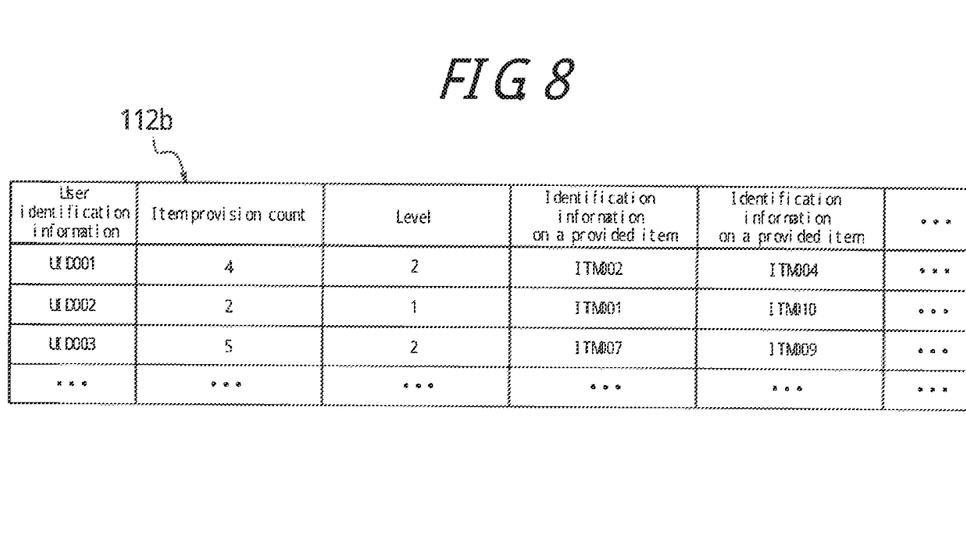
FIG. 8 is an example of user data according to Embodiment 2 of the present invention.

FIG. 8 illustrates an example of the user data 112b. As illustrated in FIG. 8, the user data 112b for example includes "UID001" as the user identification information, "4" as the item provision count, "2" as the level, and "ITM002" and "ITM004" as the identification information on a provided item. In the example illustrated in FIG. 8, the level increases by one, i.e. 2, 3, 4, . . . , each time the item provision count reaches a multiple of four, i.e. 4, 8, 12, . . . .

Figure 9:
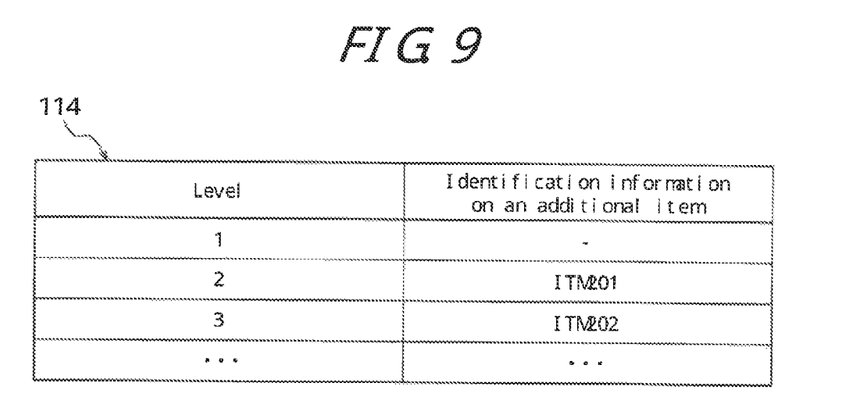
FIG. 9 is an example of additional item data by level according to Embodiment 2 of the present invention.

The control unit 12 of the server 1 in Embodiment 2 uses the additional item providing means 122 to provide an additional item to the user by including, in the item group, at least one additional item determined in accordance with the user's level. FIG. 9 illustrates an example of the additional item data by level 114. As illustrated in FIG. 9, the additional item data by level 114 includes "1" for the level and "-" for the identification information on an additional item, "2" for the level and "ITM201" for the identification information on an additional item, and so forth. Identification information on an additional item of "-" indicates that an additional item is not included in the item group. In other words, when the level is "1", an additional item is not included in the item group. Using the additional item providing means 122, the control unit 12 refers to the additional item data by level 114 and determines the additional item.

Figure 10:
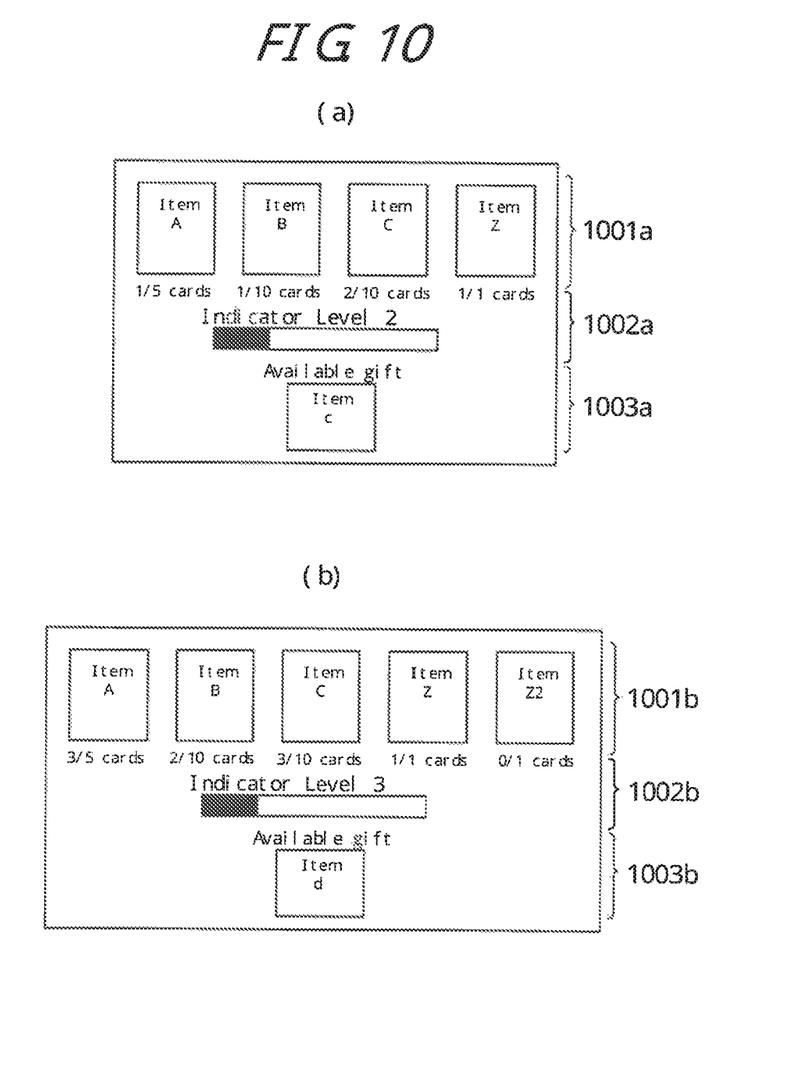
FIG. 10 is an image of provision of an additional item according to Embodiment 2.

FIG. 10 is an image of provision of an additional item in Embodiment 2. Preferably, this image is displayed on the communication terminal 2 as a screen for requesting item acquisition. Note that when this image is displayed on the communication terminal 2 as a screen for requesting item acquisition, the screen is provided with a button for transmitting an item request (not illustrated).

FIG. 10(a) is an image for when the level is "2". In area 1001a, the number of provisions of each item in the item group is shown. The number of provisions of item A, item B, item C, and item Z is 1/5 cards, 1/10 cards, 2/10 cards, and 1/1 card respectively. The indicator in area 1002a shows a value corresponding to an item provision count of "5". The value of the indicator is reset each time the level increases, and the current level is shown near the indicator. When this screen is displayed on the communication terminal 2, the indicator allows the user easily to grasp the item provision count necessary to rise to the next level. In area 1003a, information on the gift to be provided by the additional item providing means 122 for the current item provision count is displayed. In FIG. 10(a), provision of the gift "item c" is displayed.

FIG. 10(b) is an image for when the level is "3". In area 1001b, the number of provisions of each item in the item group is shown. The number of provisions of item A, item B, item C, item Z, and item Z2 is 3/5 cards, 5/10 cards, 3/10 cards, 1/1 card, and 0/1 card respectively. In FIG. 10(b), since the level has risen to "3", the item "item Z2" has been added to the item group. The indicator in area 1002b shows a value corresponding to an item provision count of "9". In area 1203b, information on the gift to be provided by the additional item providing means 122 for the current item provision count is displayed. In FIG. 10(b), provision of the gift "item d" is displayed.

Figure 11:
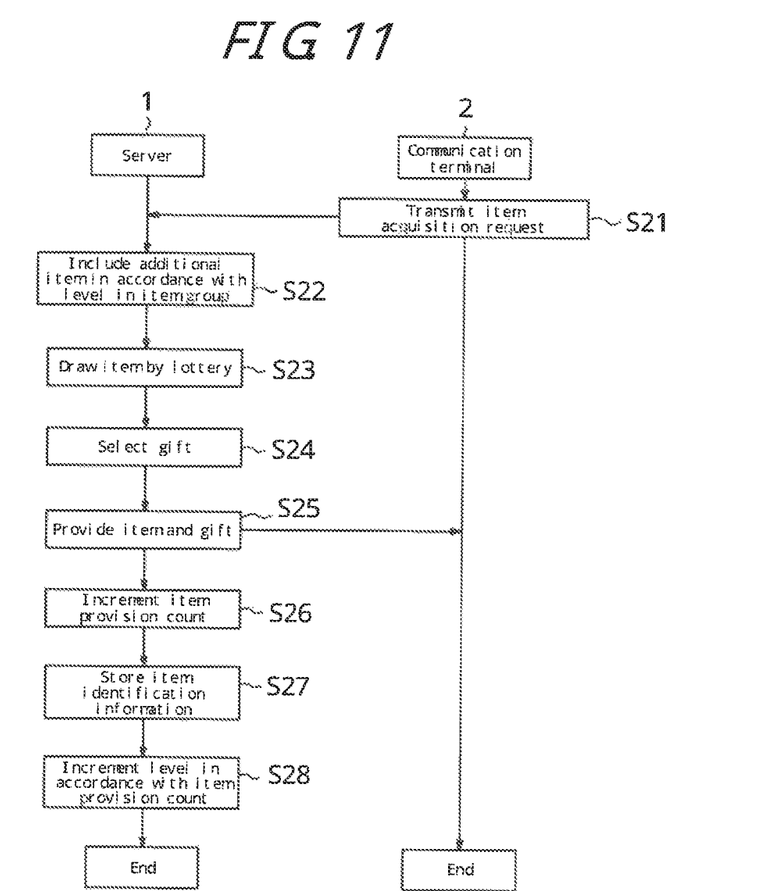
FIG. 11 is flowchart of operations by the communication system according to Embodiment 2 of the present invention.

Next, operations of the communication system according to Embodiment 2 are described using the flowchart in FIG. 11.

First, based on user operation of the operation unit 22, the control unit 23 in the communication terminal 2 transmits an item acquisition request to the server 1 via the communication unit 20 (step S21).

Next, when the server 1 receives the item acquisition request, the additional item providing means 122 of the control unit 12 refers to the user data 112 to retrieve the level of the user pertaining to the item acquisition request and refers to the additional item data by level 114 to include an additional item corresponding to the level in the item group (step S22).

Next, the control unit 12 draws an item, by lottery, from among the item group with the drawing means 121. The drawing means 121 refers to the user data 112 to draw an item, by lottery, from among items in the item group that have not yet been provided to the user (step S23).

Next, the additional item providing means 122 refers to the user data 112, and in accordance with the item provision count, selects a gift (additional item) to provide to the user based on the gift data 113 (step S24).

The control unit 12 then provides the item drawn by the drawing means 121 and the gift selected by the additional item providing means 122 to the user. Specifically, based on the item data 111, the control unit 12 transmits the item images corresponding to the item identification information for the provided item and the gift to the communication terminal 2 via the communication unit 10 (step S25).

Next, the control unit 12 increments the item provision count in the user data 112 by one (step S26). The control unit 12 also stores the item identification information for the item in the user data 112 as identification information on a provided item (step S27).

Next, the control unit 12 rewrites the level in the user data 112 in accordance with the item provision count in the user data 112 (step S28). Processing then ends.

According to Embodiment 2 of the present invention, the control unit 12 of the server 1 uses the additional item providing means 122 to provide an additional item in accordance with the level that corresponds to the item provision count. Therefore, the variations on methods for acquiring game cards and the like can be increased.

In the present embodiment, the level rises in direct proportion to the item provision count, yet the level is not limited in this way. The item provision count necessary for rising to the next level may increase as the level becomes higher. For example, the level may increase by one, i.e. 2, 3, 4, . . . , as the item provision count reaches 4, 12, 24, . . . .

Note that after reaching a predetermined level (for example, level "2"), the item provision count and level may respectively be reset to "0" and "1" if the item provision count does not reach the count necessary for the next level (level "3") within a certain time.

In the present embodiment, the server 1 provides an additional item (gift) to the user in accordance with the item provision count and includes an additional item in accordance with the level in the item group, yet the additional item may be provided to the user in either of these ways. For example, it is possible only to provide an additional item (gift) in accordance with the item provision count. In this case, step S22 in FIG. 11 is omitted. It is also possible, for example, only to include an additional item in accordance with the level in the item group based on the item provision count. In this case, step S24 in FIG. 11 is omitted, and in step S25, the server 1 only provides the item to the communication terminal 2.

A computer is preferably used to function as the communication terminal 2. A program containing the processing for achieving the functions of the communication terminal 2 is stored in the memory unit of the computer, and the functions are achieved by the central processing unit (CPU) of the computer reading and executing the program.

Although the present invention has been described by way of drawings and embodiments, it is to be noted that various changes and modifications will be apparent to those skilled in the art based on the present disclosure. Therefore, such changes and modifications are to be understood as included within the scope of the present invention. For example, the functions and the like included in the various means, steps, and the like may be reordered in any logically consistent way. Furthermore, means, steps, and the like may be combined into one or divided.

For example, in Embodiments 1 and 2, an example is described in which the item data 111, user data 112, and gift data 113 (as well as the additional item data by level 114) are stored in the memory unit 11 of the server 1, and the control unit 12 functions as the drawing means 121 and the additional item providing means 122, yet the present invention is not limited in this way. The item data 111, user data 112, gift data 113 (and additional item data by level 114), drawing means 121, and additional item providing means 122 may, for example, be provided in either the server 1 or the communication terminal 2. Out of consideration for factors such as the burden of game processing and the performance of the server 1 and the communication terminal 2, the item data 111, user data 112, gift data 113 (and additional item data by level 114), drawing means 121, and additional item providing means 122 may all be provided only in the server 1 or only in the communication terminal 2.

REFERENCE SIGNS LIST

1: Server (game server)
2: Communication terminal
10: Communication unit
11: Memory unit
111: Item data
112, 112b: User data
113: Gift data
114: Additional item data by level
12: Control unit
121: Drawing means
122: Additional item providing means
20: Communication unit
21: Display unit
22: Operation unit
23: Control unit
501a, 502a, 503a: Area
501b, 502b, 503b: Area
601, 602, 703: Area
1201a, 1202a, 1203a: Area
1201b, 1202b, 1203b: Area

The invention claimed is:

1. A server comprising:
a memory, which stores (i) an item group including a plurality of types of items with different scarcity values, and (ii) a provision count of a number of times an item is provided to a user, and
a processor,
wherein the processor:
in response to a request from the user, draws an item from among the item group stored in the memory, and provides the item to the user; and
provides an additional item to the user in accordance with the provision count, wherein the additional item provided to the user has a scarcity value that is greater than that of each of the items in the item group.

2. A server according to claim 1, wherein the processor provides the additional item to the user by including the additional item in the item group when (i) the provision count reaches a predetermined count, and (ii) a time since the provision count reached the predetermined count is within a predetermined time.

3. The server according to claim 1, wherein the processor transmits information on the provision count to a communication terminal of the user.

4. The server according to claim 3, wherein the processor provides another type of item to the user in accordance with the item that is drawn from the item group.

5. The server according to claim 4, wherein
as the item provision count becomes higher, the scarcity value of the another type of item that is provided becomes higher.

6. The server according to claim 1, wherein the processor provides another type of item to the user in accordance with the item that is drawn from the item group.

7. The server according to claim 6, wherein
as the item provision count becomes higher, the scarcity value of the another type of item that is provided becomes higher.

8. A method for controlling a communication system comprising a server and a communication terminal of a user, the server including (i) a memory, which stores an item group including a plurality of types of items with different scarcity values, and a provision count of a number of times an item is provided to a user, and (ii) a processor, the method comprising the steps of:
   (a) transmitting, by the communication terminal, an item acquisition request to the server;
   (b) in response to the item acquisition request from the communication terminal, drawing an item from among the item group stored in the memory, and providing the item to the user, step (b) being performed by the processor; and
   (c) based on the provision count, providing to the user an additional item which has a scarcity value that is greater than that of each of the items in the item group, step (c) being performed by the processor.

9. The method according to claim 8, further comprising the step of:
   (d) transmitting, by the processor, information on the provision count to the communication terminal of the user.

10. The method according to claim 9, further comprising the step of:
    (e) providing another type of item to the user in accordance with the item that is drawn from the item group.

11. The method according to claim 10, wherein
as the item provision count becomes higher, the scarcity value of the another type of item that is provided becomes higher.

12. The method according to claim 8, further comprising the step of:
    (e) providing another type of item to the user in accordance with the item that is drawn from the item group.

13. The method according to claim 12, wherein
as the item provision count becomes higher, the scarcity value of the another type of item that is provided becomes higher.

14. The method according to claim 8, wherein the additional item is provided to the user by including the additional item in the item group if (i) the provision count reaches a predetermined count, and (ii) a time since the provision count reached the predetermined count is within a predetermined time.

15. A non-transitory computer readable recording medium storing instructions for a computer functioning as a server in a communication system including the server and a communication terminal of a user, the server including (i) a memory, which stores an item group including a plurality of types of items with different scarcity values, and a provision count of a number of times an item is provided to a user, and (ii) a processor, the instructions causing the computer to perform the steps of:
    (a) in response to an item acquisition request from the communication terminal, drawing an item from among the item group stored in the memory, and providing the item to the user; and
    (b) based on the provision count, providing to the user an additional item which has a scarcity value that is greater than that of each of the items in the item group.

16. The non-transitory computer readable recording medium according to claim 15, the instructions causing the computer to further perform the step of:
    (c) transmitting, by the processor, information on the provision count to the communication terminal of the user.

17. The non-transitory computer readable recording medium according to claim 16, the instructions causing the computer to further perform the step of:
    (d) providing another type of item to the user in accordance with the item that is drawn from the item group.

18. The non-transitory computer readable recording medium according to claim 17, wherein
as the item provision count becomes higher, the scarcity value of the another type of item that is provided becomes higher.

19. The non-transitory computer readable recording medium according to claim 15, the instructions causing the computer to further perform the step of:
    (d) providing another type of item to the user in accordance with the item that is drawn from the item group.

20. The non-transitory computer readable recording medium according to claim 19, wherein
as the item provision count becomes higher, the scarcity value of the another type of item that is provided becomes higher.

* * * * *